(12) United States Patent
Yamada et al.

(10) Patent No.: US 12,663,324 B2
(45) Date of Patent: Jun. 23, 2026

(54) ELECTRODE STRUCTURE

(71) Applicant: Panasonic Automotive Systems Co., Ltd., Kanagawa (JP)

(72) Inventors: Takumi Yamada, Kyoto (JP); Takateru Sawada, Osaka (JP); Hiroshi Naitou, Osaka (JP)

(73) Assignee: Panasonic Automotive System Co., Ltd., Kanagawa (JP)

( * ) Notice: Subject to any disclaimer, the term of this patent is extended or adjusted under 35 U.S.C. 154(b) by 296 days.

(21) Appl. No.: 18/627,007

(22) Filed: Apr. 4, 2024

(65) Prior Publication Data

US 2024/0344907 A1 Oct. 17, 2024

(30) Foreign Application Priority Data

Apr. 14, 2023 (JP) ................................ 2023-066577

(51) Int. Cl.
| | |
|---|---|
| *G01L 1/14* | (2006.01) |
| *B62D 1/04* | (2006.01) |
| *B62D 1/06* | (2006.01) |
| *G01L 5/22* | (2006.01) |

(52) U.S. Cl.
CPC .............. *G01L 1/142* (2013.01); *B62D 1/046* (2013.01); *B62D 1/065* (2013.01); *G01L 5/221* (2013.01)

(58) Field of Classification Search
CPC .......... B62D 1/04; B62D 1/046; B62D 1/065; B62D 1/10; B62D 15/00; G01L 1/142; G01L 5/221
See application file for complete search history.

(56) References Cited

U.S. PATENT DOCUMENTS

| | | | | |
|---|---|---|---|---|
| 2012/0006148 A1* | 1/2012 | Nagata | ................ | B60R 16/0215 |
| | | | | 74/558 |
| 2012/0326735 A1 | 12/2012 | Bennett et al. | | |
| 2018/0354543 A1* | 12/2018 | Nishio | ................... | B62D 1/065 |
| 2019/0210629 A1* | 7/2019 | Kwon | ................... | G06F 3/0448 |
| 2019/0373728 A1* | 12/2019 | Hengel | ................... | H05K 1/18 |

FOREIGN PATENT DOCUMENTS

| | | |
|---|---|---|
| JP | 2014516873 A | 7/2014 |
| WO | WO 2012177902 A2 | 12/2012 |

\* cited by examiner

*Primary Examiner* — Benjamin R Schmitt

(74) *Attorney, Agent, or Firm* — Seed Intellectual Property Law Group LLP

(57) ABSTRACT

An electrode structure is an electrode structure to be wound around a rim of a steering wheel provided in a vehicle, the electrode structure including: a base material; a first sensor electrode disposed on one surface of the base material; a second sensor electrode disposed on the one surface of the base material to be aligned with the first sensor electrode; a first harness extended from the first sensor electrode; a second harness extended from the second sensor electrode; a connector to which the first harness and the second harness are connected; and a relay connector including a male connector and a female connector that is connected to the male connector. At least one of the first harness or the second harness is provided with the relay connector.

7 Claims, 7 Drawing Sheets

ELECTRODE STRUCTURE

CROSS REFERENCE TO RELATED APPLICATION

The present application is based on and claims priority of Japanese Patent Application No. 2023-066577 filed on Apr. 14, 2023.

FIELD

The present disclosure relates to an electrode structure.

BACKGROUND

A sensor system described in Patent Literature (PTL) 1 includes: a first sensor disposed in a first portion of a steering wheel to detect contact with the front surface's left side of the steering wheel; a second sensor disposed in a second portion of the steering wheel, separate from the first portion, to detect contact with the front surface's right side of the steering wheel; and a third sensor disposed in the steering wheel to detect contact with the back surface of the steering wheel. The first, second, and third sensors are configured to be able to detect contact with the front surface's left side, the front surface's right side, and the back surface of the steering wheel.

CITATION LIST

Patent Literature

PTL 1: Japanese Unexamined Patent Application Publication (Translation of PCT Application) No. 2014-516873

SUMMARY

The electrode structure according to PTL1 above can be improved upon.

In view of this, the electrode structure of the present disclosure is capable of improving upon the above related art.

An electrode structure according to one aspect of the present disclosure is an electrode structure to be wound around a rim of a steering wheel provided in a vehicle, the electrode structure including: a base material; a first sensor electrode disposed on one surface of the base material; a second sensor electrode disposed on the one surface of the base material to be aligned with the first sensor electrode; a first harness extended from the first sensor electrode; a second harness extended from the second sensor electrode; a connector to which the first harness and the second harness are connected; and a relay connector including a male connector and a female connector that is connected to the male connector. At least one of the first harness or the second harness is provided with the relay connector.

The electrode structure of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
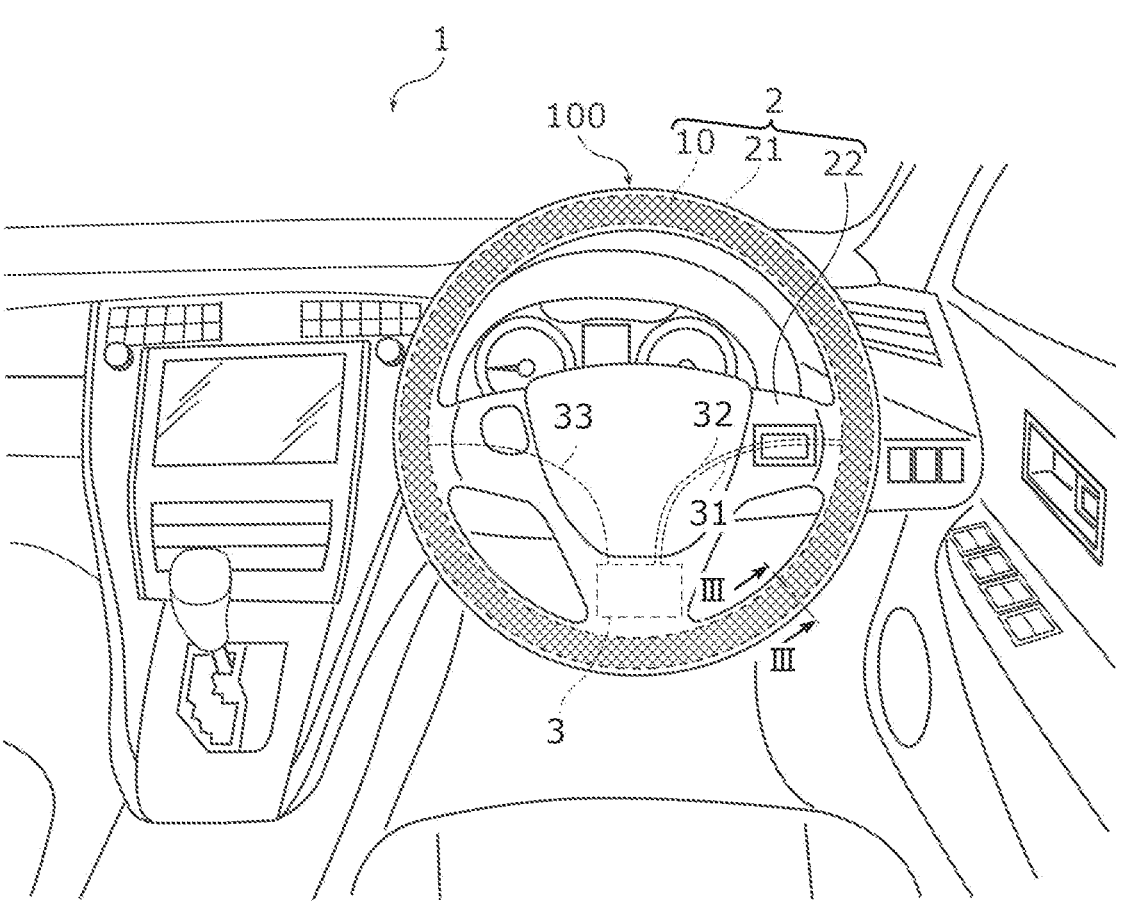
FIG. 1 illustrates an example of a vehicle cabin in which a grip sensor is disposed according to an embodiment.

Note that an exemplary embodiment described below is intended to show either a comprehensive example or a specific example. Numerical values, shapes, materials, components, arrangement positions of components, connection forms, steps, order of steps, and the like shown in the following embodiment are examples, and are not intended to limit the present disclosure. Among the components in the following embodiment, components that are not described in the independent claim are described as optional components.

Each figure is a schematic view and is not necessarily strictly illustrated. In each figure, the same components are denoted by the same reference numerals.

In the following embodiment, expressions such as a "strip shape" and a "circumferential direction" are used. For example, the terms "strip shape" and "circumferential direction" do not only refer to complete strips and circumferential directions, but also to those substantially similar to strips and circumferential directions, that is, including variations of about a few percent. Also, the terms "strip shape" and "circumferential direction" refer to strip shapes and circumferential directions to the extent that the effects of the present disclosure can be achieved. The same applies to other expressions using "shape" or "direction".

An embodiment of the present invention will be described in detail below with reference to the drawings.

Embodiment

[Configuration]

In the present embodiment, electrode structure 10 will be described with reference to FIGS. 1 to 4.

Figure 2:
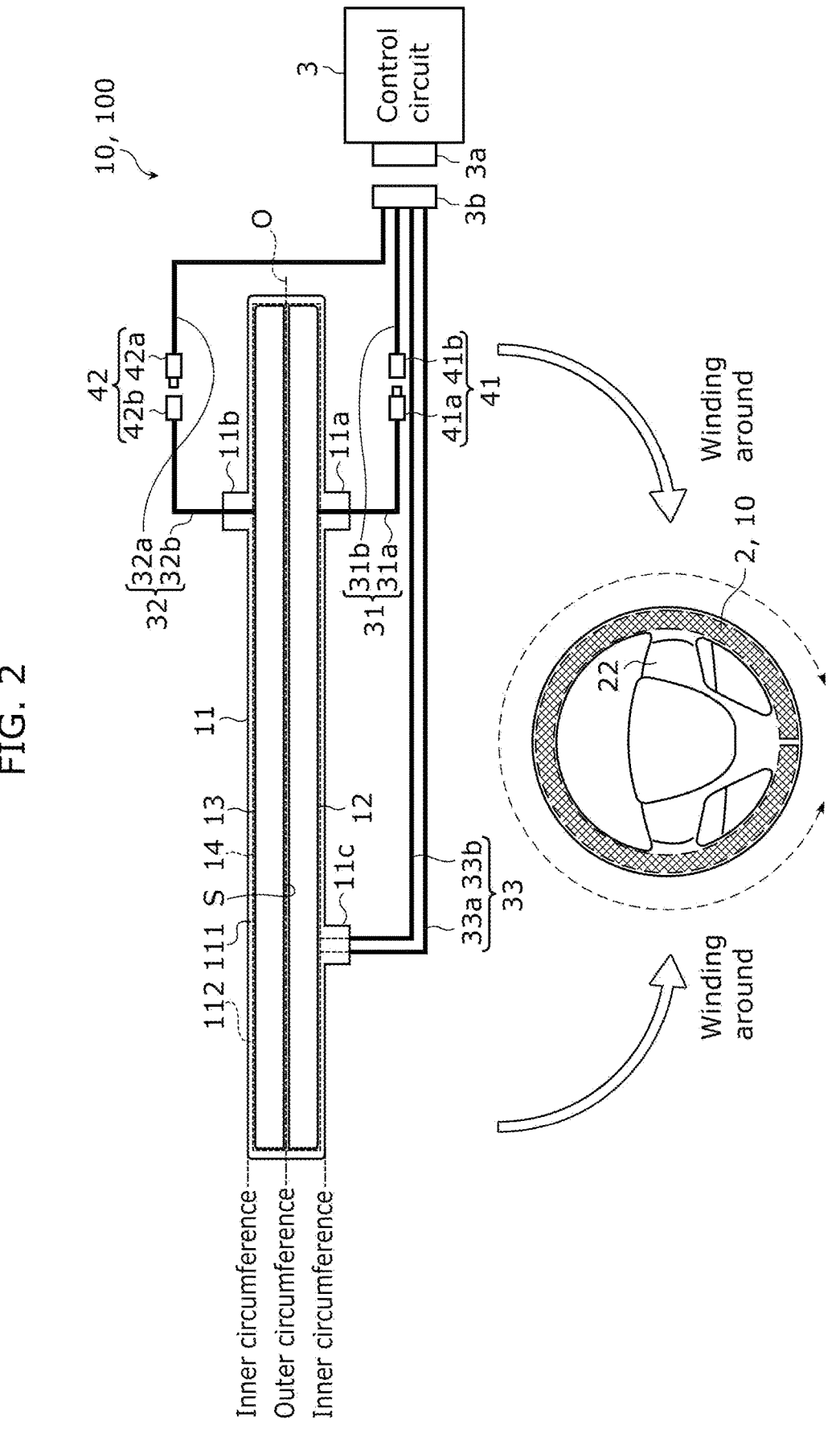
FIG. 2 illustrates an example of winding an electrode structure around the rim according to the embodiment.
Figure 3:
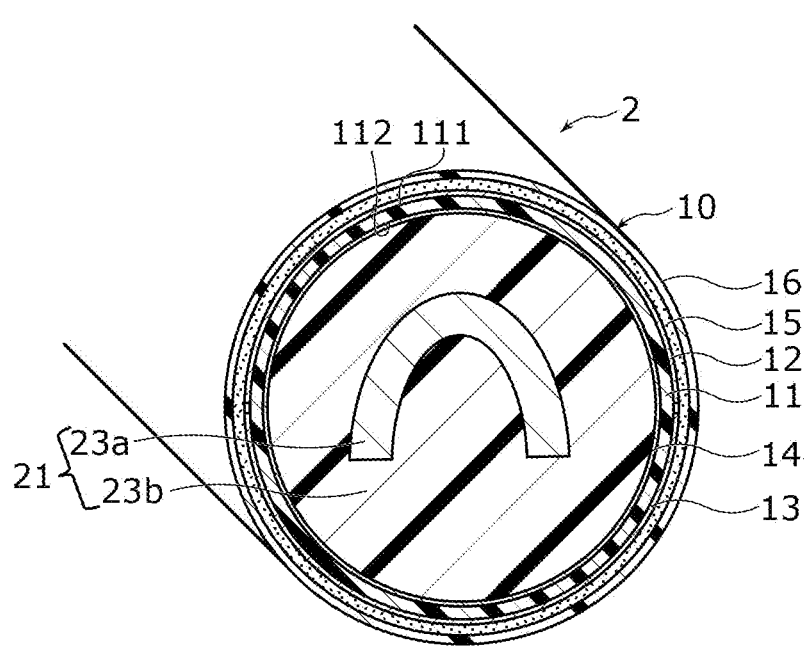
FIG. 3 is a cross-sectional view of a steering wheel taken along line III-III of FIG. 1.
Figure 4:
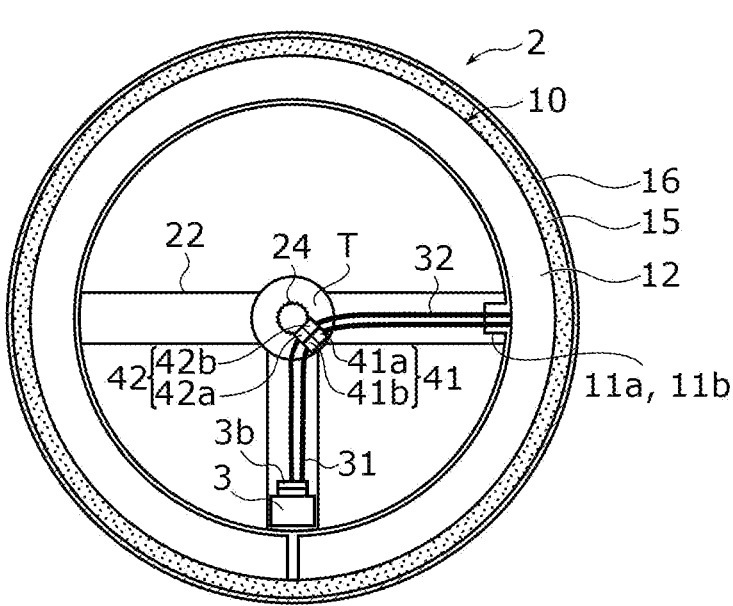
FIG. 4 is a partial cross-sectional view illustrating the arrangement of a first harness, a second harness, a first relay connector, and a second relay connector of the electrode structure mounted on the steering wheel.

FIG. 1 illustrates an example of a cabin of vehicle 1 in which grip sensor 100 according to the embodiment is disposed. FIG. 2 illustrates an example of winding electrode structure 10 around rim 21 according to the embodiment. FIG. 3 is a cross-sectional view of steering wheel 2 taken along line III-III of FIG. 1. FIG. 4 is a partial cross-sectional view illustrating the arrangement of first harness 31, second harness 32, first relay connector 41, and second relay connector 42 of electrode structure 10 mounted on steering wheel 2. In FIG. 4, third harness 33 and the like are omitted to avoid complicating the figure. FIG. 4 illustrates a cross-section of electrode structure 10 in a state partially exposed from steering wheel 2.

As illustrated in FIGS. 1 and 2, electrode structure 10 of the present embodiment has a strip shape and is wound around rim 21 of steering wheel 2 provided in vehicle 1.

Steering wheel 2 can provide a steering angle with respect to the steering wheel of vehicle 1. Steering wheel 2 includes rim 21, spoke 22 having a T shape and integrally formed on the inner circumferential surface of rim 21, electrode structure 10, and control circuit 3.

As illustrated in FIGS. 2 and 3, rim 21 includes metal core 23*a*, which is circular in cross-section when taken in a direction perpendicular to the circumferential direction of steering wheel, and resin member 23*b* covering core 23. Spoke 22 is provided with a horn switch cover that covers a horn switch disposed in the central portion. Electrode structure 10 is wound around rim 21 along the circumferential direction of rim 21 to cover the surface of circular rim 21. In this case, both longitudinal ends of electrode structure 10 are disposed to be adjacent to each other at the lower end of rim 21. First surface layer portion 15 is provided on the outer circumferential surface of electrode structure 10, and second surface layer portion 16 is further provided on the outer circumferential surface of first surface layer portion 15. First surface layer portion 15 is made of, for example, a resin material such as urethane. Second surface layer portion 16 is a portion in direct contact with a person's hand and constitutes the outer circumferential surface of steering wheel 2. Second surface layer portion 16 is made of a material such as leather, wood, or resin.

Electrode structure 10 of the present embodiment is configured as a part of in-vehicle grip sensor 100.

As illustrated in FIG. 2, grip sensor 100 is a capacitive sensor that detects the gripping of steering wheel 2 by the person's hand. Grip sensor 100 is mounted on steering wheel 2 of vehicle 1. Specifically, grip sensor 100 includes electrode structure 10 embedded in steering wheel 2, and control circuit 3 that detects gripping based on a signal from electrode structure 10. Control circuit 3 is embedded in, for example, spoke 22.

A specific configuration of electrode structure 10 will be described below.

Electrode structure 10 according to the present embodiment includes base material 11, first sensor electrode 12, second sensor electrode 13, first harness 31, second harness 32, ground electrode 14, third harness 33, connector 3*b* for electrical connection to connector 3*a* of control circuit 3 (hereinafter occasionally referred to as electronic control unit (ECU) connector 3*b*), and a relay connector.

Base material 11 is an insulating member formed in an elongated sheet shape from an elastic, flexible, and ductile material. For example, base material 11 is a foam material made of a synthetic resin such as polyethylene (PE), polyethylene terephthalate (PET), or polyurethane (PU). Base material 11 is formed according to the shape and size of rim

21. Note that base material 11 is not limited to a ductile material, and for example, a non-woven fabric with low ductility may be used.

Base material 11 includes one surface 111 and other surface 112. First sensor electrode 12 and second sensor electrode 13 are disposed on one surface 111.

First sensor electrode 12 forms a strip shape along the longitudinal direction of base material 11, and is disposed on one surface 111 of base material 11. Second sensor electrode 13 forms a strip shape along the longitudinal direction of base material 11 and is disposed to be aligned with first sensor electrode 12 on one surface 111 of base material 11. First sensor electrode 12 and second sensor electrode 13 are arranged on one surface 111 of base material 11, separated by predetermined gap S so as not to be to electrically connected to each other.

In the present embodiment, first sensor electrode 12 and second sensor electrode 13 are disposed on one surface 111 of base material 11, separated by predetermined gap S and bordered by center line O that divides the transverse direction of base material 11 into two parts. When electrode structure 10 is wound around rim 21, center line O of base material 11 is positioned at the outer circumferential edge of rim 21, and both end edges along the longitudinal direction of base material 11 are positioned at the inner circumferential edge of rim 21. When electrode structure 10 is wound around rim 21, first sensor electrode 12 and second sensor electrode 13 are arranged from the outer circumferential side of rim 21 to the inner circumferential side of rim 21. As a result, first sensor electrode 12 is disposed on the side facing the seat of vehicle 1, and second sensor electrode 13 is disposed on the side opposite to first sensor electrode 12. In other words, when electrode structure 10 is wound around rim 21, first sensor electrode 12 is disposed on the side of rim 21 facing the rear side of vehicle 1, and second sensor electrode 13 is disposed on the side of rim 21 facing the front side of vehicle 1.

As described above, first sensor electrode 12 is annularly disposed to cover the side of rim 21 facing the rear side of vehicle 1, and second sensor electrode 13 is annularly disposed to cover the side of rim 21 facing the front side of vehicle 1. Therefore, no matter which position of steering wheel 2 the person's hand grips, grip sensor 100 can detect that gripping.

First sensor electrode 12 and second sensor electrode 13 are fixed to one surface 111 of base material 11 by an adhesive layer. Each of first sensor electrode 12 and second sensor electrode 13 is a solid electrode with a planar structure made of a conductor or a resistor. Note that each of first sensor electrode 12 and second sensor electrode 13 may be a linear electrode and may take any form as long as it is a conductive member.

First harness 31 is extended from first sensor electrode 12. The location on first sensor electrode 12, from which first harness 31 is extended, is a location corresponding to the position where spoke 22 is disposed when electrode structure 10 is wound around rim 21. First protrusion 11*a* is formed in base material 11 to correspond to the location from which first harness 31 is extended. First protrusion 11*a* is disposed on spoke 22 when electrode structure 10 is wound around rim 21. In first protrusion 11*a*, first sensor electrode 12 and one end of first harness 31 are electrically connected by a fastening member. The other end of first harness 31 is connected to ECU connector 3*b*.

Second harness 32 is extended from second sensor electrode 13. The location on second sensor electrode 13, from which second harness 32 is extended, is a location corresponding to the position where spoke 22 is disposed when electrode structure 10 is wound around rim 21. Second protrusion 11b is formed in base material 11 to correspond to the location from which second harness 32 is extended. Second protrusion 11b is disposed on spoke 22 when electrode structure 10 is wound around rim 21. In second protrusion 11b, second sensor electrode 13 and one end of second harness 32 are electrically connected by a fastening member. The other end of second harness 32 is connected to ECU connector 3b.

At least one of first harness 31 or second harness 32 is provided with a relay connector. In the present embodiment, each of first harness 31 and second harness 32 is provided with a relay connector. As illustrated in FIG. 2, when third harness 33, which will be described later, is provided, a relay connector needs to be provided at second harness 32 to prevent the formation of a loop among base material 11, first harness 31, second harness 32, third harness 33, and connector 3b.

The relay connector provided at first harness 31 can separate single first harness 31 or form single first harness 31. The relay connector provided at second harness 32 can separate single second harness 32 or form single second harness 32. Here, first harness 31 includes first harness 31a located on first sensor electrode 12 side, and first harness 31b located on ECU connector 3b side. Second harness 32 includes second harness 32b located on second sensor electrode 13 side, and second harness 32a located on ECU connector 3b side.

The relay connector includes first relay connector 41 provided at first harness 31 and second relay connector 42 provided at second harness 32.

First relay connector 41 includes first male connector 41a and first female connector 41b that is connected to first male connector 41a. First male connector 41a is connected to first harness 31a located on first sensor electrode 12 side, and first female connector 41b is connected to first harness 31b located on ECU connector 3b side. Note that first male connector 41a may be connected to first harness 31b located on ECU connector 3b side, and first female connector 41b may be connected to first harness 31a located on first sensor electrode 12 side. Connecting male connector 41a and first female connector 41b to each other forms single first harness 31, and disconnecting first male connector 41a and first female connector 41b from each other separates single first harness 31 into two parts.

Second relay connector 42 includes second male connector 42a and second female connector 42b that is connected to second male connector 42a. Second female connector 42b is connected to second harness 32b located on second sensor electrode 13 side, and second male connector 42a is connected to second harness 32a located on ECU connector 3b side. Note that second female connector 42b may be connected to second harness 32a located on ECU connector 3b side, and second male connector 42a may be connected to second harness 32b located on second sensor electrode 13 side. Connecting second male connector 42a and second female connector 42b to each other forms one second harness 32, and disconnecting second male connector 42a and second female connector 42b from each other separates single second harness 32 into two parts.

In the present embodiment, the arrangement of first male connector 41a and first female connector 41b provided at first harness 31 differs from the arrangement of second male connector 42a and second female connector 42b provided at second harness 32.

Specifically, when first male connector 41a is disposed at first harness 31a located on first sensor electrode 12 side, and first female connector 41b is disposed at first harness 31b located on ECU connector 3b side, second male connector 42a is disposed at second harness 32a located on ECU connector 3b side, and second female connector 42b is disposed at second harness 32b located on second sensor electrode 13 side. Note that, when first female connector 41b is disposed at first harness 31a located on first sensor electrode 12 side, and first male connector 41a is disposed at first harness 31b located on ECU connector 3b side, second male connector 42a may be disposed at second harness 32b located on second sensor electrode 13 side, and second female connector 42b may be disposed at second harness 32a located on ECU connector 3b side.

First male connector 41a and second male connector 42a are included in the male connector. First female connector 41b and second female connector 42b are included in the female connector.

First relay connector 41 and second relay connector 42 have the same configuration. That is, first male connector 41a and second female connector 42b can be connected to each other, and second male connector 42a and first female connector 41b can be connected to each other.

As illustrated in FIG. 4, the length of at least one of first harness 31 or second harness 32 is a length that enables the relay connector to be disposed in central region T of steering wheel 2 and near shaft 24 of steering wheel 2. In the present embodiment, first relay connector 41 is disposed at first harness 31, and second relay connector 42 is disposed at second harness 32. Thus, first relay connector 41 and second relay connector 42 are disposed near shaft 24 of steering wheel 2.

As illustrated in FIGS. 2 and 3, ground electrode 14 is disposed on other surface 112 of base material 11. Ground electrode 14 is disposed on other surface 112 of base material 11 so as not to be electrically connected to first sensor electrode 12 or second sensor electrode 13. When electrode structure 10 is wound around rim 21, ground electrode 14 is disposed on the surface of rim 21.

Ground electrode 14 is fixed to other surface 112 of base material 11 by an adhesive layer. Ground electrode 14 is formed of a metal wire (conductive wire) such as a copper wire. Note that ground electrode 14 may be a solid electrode with a planar structure made of a conductor or a resistor and may take any form as long as it is a conductive member.

As illustrated in FIG. 2, third harness 33 is extended from ground electrode 14. The location on ground electrode 14, from which third harness 33 is extended, is a location corresponding to the position where spoke 22 is disposed when electrode structure 10 is wound around rim 21. Third protrusion 11c is formed in base material 11 to correspond to the location from which third harness 33 is extended. Third protrusion 11c is disposed on spoke 22 when electrode structure 10 is wound around rim 21. In third protrusion 11c, ground electrode 14 and one end of third harness 33 are electrically connected by a fastening member. The other end of third harness 33 is connected to ECU connector 3b.

The other end of first harness 31, the other end of second harness 32, and the other end of third harness 33 are connected to ECU connector 3b. ECU connector 3b can be electrically connected to connector 3a of control circuit 3.

In the present embodiment, since ground electrode 14 is formed of a metal wire, one end thereof is electrically connected to first electric wire 33a, and the other end thereof is electrically connected to second electric wire 33b. First electric wire 33a and second electric wire 33b are cables for electrically connecting ground electrode 14 to control circuit 3, and constitute third harness 33. First electric wire 33a and second electric wire 33b are electrically connected to ground electrode 14 by a fastening member.

Ground electrode 14 is sewn to other surface 112 of base material 11 to form a zigzag pattern. Ground electrode 14 is a resin-coated metal wire and is used as a heater element. When control circuit 3 causes a current to flow through ground electrode 14, ground electrode 14 generates heat. Ground electrode 14 can warm electrode structure 10 through this heat generation, thereby warming steering wheel 2. This enables the person in vehicle 1 to comfortably grip steering wheel 2 even when it is cold in the vehicle. Note that, since ground electrode 14 is used as a heater element, the positive electrode of a direct-current (DC) power supply (not illustrated) is connected to one of first electric wire 33a or second electric wire 33b, and the negative electrode of the power supply is connected to the other. However, when viewed from first sensor electrode 12 and second sensor electrode 13 driven by alternating current (AC), both the positive and negative electrodes of the DC power supply are at the ground potential, and hence the entire metal wire is referred to as ground electrode 14.

Control circuit 3 is electrically connected to first sensor electrode 12 and second sensor electrode 13. Based on signals transmitted from first sensor electrode 12 and second sensor electrode 13, control circuit 3 detects whether or not the person's hand is in contact with steering wheel 2, that is, the contact of the human hand with steering wheel 2 and the contact position of the hand. When the person's hand grips steering wheel 2, a change occurs in each of the electrostatic capacitances between the hand and first sensor electrode 12 of electrode structure 10, and between the hand and second sensor electrode 13 of electrode structure 10. Control circuit 3 detects gripping based on output signals with changed electrostatic capacitances from these sensor electrodes. For example, when the detected electrostatic capacitance is larger than or equal to a specified value, control circuit 3 can determine that the person's hand is touching or gripping steering wheel 2. Control circuit 3 is formed of a dedicated circuit or a general-purpose processor.

When ground electrode 14 is formed of a metal wire, control circuit 3 applies a DC voltage from the power supply. This enables ground electrode 14 to function as a steering heater. In this case, ground electrode 14 can generate heat by the electric power from the power supply to warm the surface of steering wheel 2, thereby warming the hand that grips steering wheel 2.

[Operational Effects]

Next, the operational effects of electrode structure 10 according to the present embodiment will be described.

For example, in the sensor system of Patent Document 1 described above, when the first sensor, the second sensor, and the third sensor are disposed on one surface of the base material, harnesses that are connected to the first sensor, the second sensor, and the third sensor, respectively, may be bundled into one connector for an electronic control unit (ECU). At this time, depending on the arrangement of the first sensor, the second sensor, and the third sensor with respect to the rim of the steering wheel, a loop may be formed by the base material on which the first sensor, the second sensor, and the third sensor are arranged, the respective harnesses, and the ECU connector. Thus, if shipped in this state, the electrode structure cannot be assembled to the rim of the steering wheel. Accordingly, a problem arises in that there is a need to perform processes, such as connecting each harness to the ECU connector, after the assembly to the rim, thereby complicating the processes performed during the assembly to the rim.

However, as described above, electrode structure 10 according to the present embodiment is electrode structure 10 that is wound around rim 21 of steering wheel 2 provided in vehicle 1 and includes: base material 11; first sensor electrode 12 disposed on one surface 111 of base material 11; second sensor electrode 13 disposed on one surface 111 of base material 11 to be aligned with first sensor electrode 12; first harness 31 extended from first sensor electrode 12; second harness 32 extended from second sensor electrode 13; connector 3b to which first harness 31 and second harness 32 are connected; and a relay connector including a male connector and a female connector that is connected to the male connector. At least one of first harness 31 or second harness 32 is provided with the relay connector.

For example, in the related art, to prevent the formation of a loop among the base material, the harness, and the ECU connector, the following processes are necessary after the winding of the base material around the rim: electrically connecting the first harness to the first sensor electrode of the base material; and electrically connecting the second harness to the second sensor electrode of the base material. This makes the assembly process for the electrode structure to the rim more complicated.

However, according to the present embodiment, even if a loop is formed by base material 11, first harness 31, second harness 32, and ECU connector 3b, at least one of first harness 31 or second harness 32 is provided with the relay connector that enables the disconnection between the male connector and the female connector. Thus, when electrode structure 10 is assembled to rim 21, electrode structure 10 can be wound around rim 21 with the male connector and the female connector in a disconnected state, and thereafter, the male connector and the female connector can be connected to each other.

Therefore, according to electrode structure 10 of the present embodiment, the process for assembly to rim 21 of steering wheel 2 can be simplified. As a result, it is possible to prevent a substantial rise in the manufacturing cost of steering wheel 2.

In electrode structure 10 according to the present embodiment, in a state where base material 11 is disposed on rim 21, first sensor electrode 12 is disposed on the side of rim 21 facing the rear side of vehicle 1, and second sensor electrode 13 is disposed on the side of rim 21 facing the front side of vehicle 1.

According to the above, the male connector and the female connector can be connected to each other after the winding of electrode structure 10 around rim 21, thereby preventing the formation of the loop described above. Hence it is possible to simplify the process of connecting first harness 31 to first sensor electrode 12 of base material 11 and the process of connecting second harness 32 to second sensor electrode 13 of base material 11 after the winding of base material 11 around rim 21.

In electrode structure 10 according to the present embodiment, the relay connector includes first relay connector 41 provided at first harness 31 and second relay connector 42 provided at second harness 32. First relay connector 41 includes first male connector 41a and first female connector 41b that is connected to first male connector 41a. Second relay connector 42 includes second male connector 42a and second female connector 42b that is connected to second male connector 42a.

For example, when the electrode structure is to be shipped without bending, it is necessary to increase the lengths of the first harness and the second harness. In this case, a substantial rise occurs in the manufacturing cost of the electrode structure.

However, according to the present embodiment, it is possible to prevent the lengths of first harness 31 and second harness 32 from becoming excessively long, thus preventing a substantial rise in the manufacturing cost of electrode structure 10.

By placing first male connector 41a and first female connector 41b, as well as second male connector 42a and second female connector 42b, into the disconnected state, it is possible to prevent the deformation of electrode structure 10 caused by the bending of electrode structure 10 at the time of shipment, even when the lengths of first harness 31 and second harness 32 are shortened. Therefore, electrode structure 10 can be shipped while maintaining its quality.

Furthermore, when electrode structure 10 is assembled to rim 21, first harness 31 and second harness 32 are unlikely to be greatly bent on spoke 22 due to the excessive lengths of first harness 31 and second harness 32. This can prevent the assembly process for electrode structure 10 to rim 21 from becoming more complicated.

Electrode structure 10 according to the present embodiment further includes ground electrode 14 disposed on other surface 112 of base material 11, and third harness 33 extended from ground electrode 14. Third harness 33 is further connected to connector 3b.

According to the above, with first relay connector 41 provided at first harness 31 and second relay connector 42 in second harness 32, first male connector 41a and first female connector 41b, as well as second male connector 42a and second female connector 42b, can be disconnected when electrode structure 10 is shipped. Therefore, even when the lengths of not only first harness 31 and second harness 32 but also third harness 33 are shortened, it is possible to prevent the deformation of electrode structure 10 due to the bending of electrode structure 10. Therefore, electrode structure 10 can be shipped while maintaining its quality.

Furthermore, when electrode structure 10 is assembled to rim 21, third harness 33 is unlikely to be greatly bent on spoke 22 due to the excessive length of third harness 33. This can prevent the assembly process for electrode structure 10 to rim 21 from becoming more complicated.

In electrode structure 10 according to the present embodiment, the length of at least one of first harness 31 or second harness 32 is a length that enables the relay connector to be disposed in central region T of steering wheel 2 and near shaft 24 of steering wheel 2.

For example, if the relay connector is disposed at a position away from the shaft, a moment of inertia proportionate to the radial distance from the center of the shaft occurs when the steering wheel vibrates due to the traveling of the vehicle, leading to an increased moment of inertia applied to the relay connector. This could conceivably result in damage to the relay connector or in disconnection between the male connector and the female connector.

However, according to the present embodiment, since the relay connector can be disposed near shaft 24, the moment of inertia applied to the relay connector is small even when steering wheel 2 vibrates due to the traveling of vehicle 1. This can reduce the vibration applied to the relay connector. Therefore, it is possible to prevent damage to the relay connector or disconnection between the male connector and the female connector.

In electrode structure 10 according to the present embodiment, first harness 31 includes first harness 31a located on first sensor electrode 12 side, and first harness 31b located on connector 3b side. Second harness 32 includes second harness 32b located on second sensor electrode 13 side, and second harness 32a located on connector 3b side. Furthermore, first male connector 41a is disposed at first harness 31a located on first sensor electrode 12 side, first female connector 41b is disposed at first harness 31b located on connector 3b side, second female connector 42b is disposed at second harness 32b located on second sensor electrode 13 side, and second male connector 42a is disposed at second harness 32a located on connector 3b side. Alternatively, first female connector 41b is disposed at first harness 31a located on first sensor electrode 12 side, first male connector 41a is disposed at first harness 31b located on connector 3b side, second male connector 42a is disposed at second harness 32b located on second sensor electrode 13 side, and second female connector 42b is disposed at second harness 32a located on connector 3b side.

This makes the arrangement of first male connector 41a and first female connector 41b in first relay connector 41 different from the arrangement of second male connector 42a and second female connector 42b in second relay connector 42. Therefore, it is possible to avoid connecting first male connector 41a to second male connector 42a, or connecting first female connector 41b to second female connector 42b, when electrode structure 10 is assembled to rim 21, in contrast to a configuration with first relay connector 41 and second relay connector 42 having the same male-female relationship.

In electrode structure 10 according to the present embodiment, first male connector 41a and second female connector 42b can be connected to each other, and second male connector 42a and first female connector 41b can be connected to each other.

According to the above, by connecting first male connector 41a to second female connector 42b and first female connector 41b to second male connector 42a, it is possible to ship the electrode structure without bending and prevent entry of foreign matter into each connector and damage to each connector during shipping and transportation.

(Variation 1 of Embodiment)

First, electrode structure 10a of the present variation will be described with reference to FIGS. 5 and 6.

Figure 5:
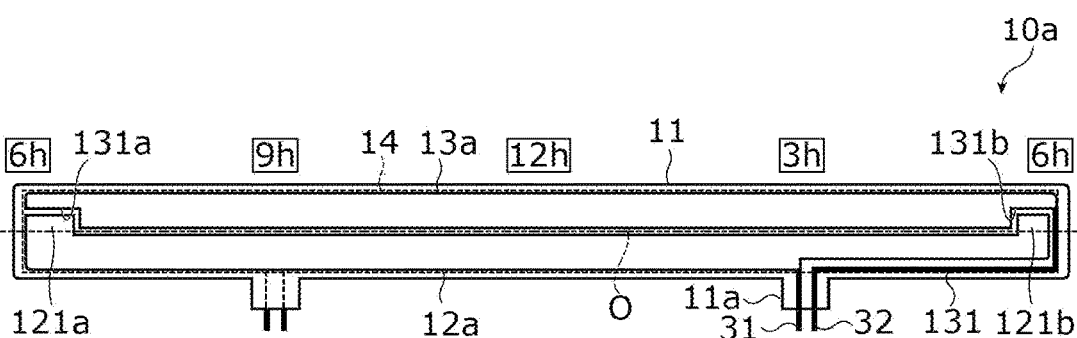
FIG. 5 is a plan view illustrating an electrode structure according to Variation 1 of the embodiment.

FIG. 5 is a plan view illustrating electrode structure 10a according to Variation 1 of the embodiment. FIG. 6 is a perspective view illustrating a positional relationship between first sensor electrode 12a and second sensor electrode 13a in a state where electrode structure 10a according to Variation 1 of the embodiment is wound around rim 21. In FIG. 6, extended wiring 131, a predetermined gap, and the like are omitted to avoid complicating the figure.

The present variation differs from the embodiment in that the configurations of first sensor electrode 12a and second sensor electrode 13a are different from those of the embodiment. Other configurations in the present variation are similar to those in the embodiment unless otherwise specified. The same reference numerals are assigned to the same configurations, and a detailed description of these configurations is omitted.

In FIG. 5, when base material 11 wound around rim 21 is viewed as if it were a clock face, the position of the longitudinal center of base material 11 is indicated as 12 o'clock (12h), both ends of base material 11 are indicated as 6 o'clock (6h), the space between one end of base material 11 and the 12h position is indicated as 9 o'clock (9h), and the space between the other end of base material 11 and the 12*h* position is indicated as 3 o'clock (3*h*). In the subsequent figures as well, these positions may be indicated in the same manner.

First sensor electrode 12*a* and second sensor electrode 13*a* each form an elongated strip shape along the longitudinal direction of base material 11.

Notches 131*a*, 131*b*, which are partially cut, are formed at both ends of second sensor electrode 13*a*. Specifically, notch 131*a* is formed at a position from 6*h* to 7*h* at one end of base material 11, and notch 131*b* is formed at a position from 5*h* to 6*h* at the other end of base material 11.

At both ends of first sensor electrode 12*a*, overhangs 121*a*, 121*b* are formed to overhang from center line O of base material 11 toward notches 131*a*, 131*b*. Specifically, overhang 121*a* is formed at a position from 6*h* to 7*h* at one end of base material 11, and overhang 121*b* is formed at a position from 5*h* to 6*h* at the other end of base material 11.

First protrusion 11*a* is formed in base material 11 at the 3*h* position to correspond to the location on first sensor electrode 12*a* from which first harness 31 is extended. In second sensor electrode 13*a*, extended wiring 131 is formed, running from notch 131*b* at the 6*h* position on base material 11 to first protrusion 11*a* of base material 11, while passing by overhang 121*b* of first sensor electrode 12*a* on base material 11. In first protrusion 11*a*, first sensor electrode 12*a* and one end of first harness 31 are electrically connected by a fastening member, and extended wiring 131 of second sensor electrode 13*a* and one end of second harness 32 are electrically connected by a fastening member. The other end of first harness 31 and the other end of second harness 32 are connected to ECU connector 3*b*. Here, extended wiring 131 may be a part of second sensor electrode 13*a*, may be a metal wire sewn and fixed to base material 11, or may be a lead wire.

Figure 6:
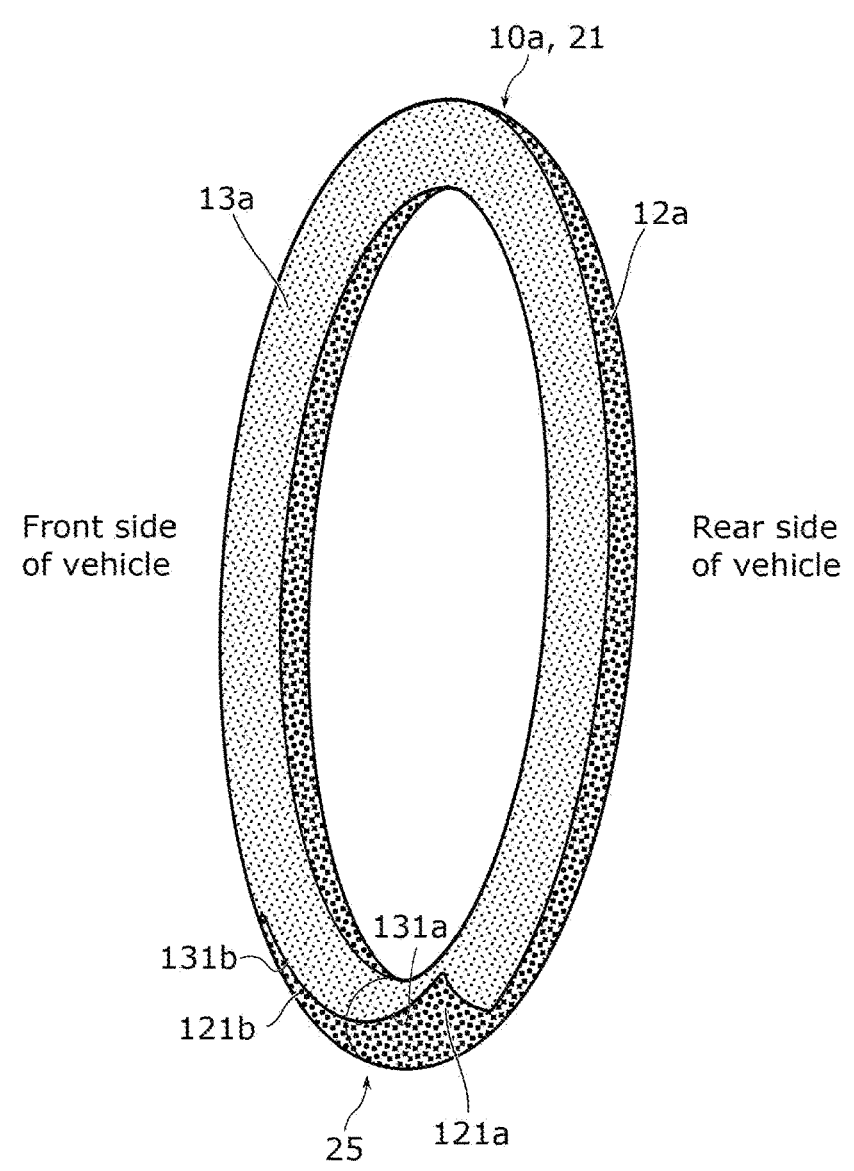
FIG. 6 is a perspective view illustrating a positional relationship between a first sensor electrode and a second sensor electrode in a state where the electrode structure is wound around the rim according to Variation 1 of the embodiment.

As illustrated in FIG. 6, when electrode structure 10*a* with such a configuration is wound around rim 21, both ends of first sensor electrode 12*a* are disposed in lower-limb facing portion 25, which is the lower end portion of steering wheel 2. Lower-limb facing portion 25 is a portion of steering wheel 2, which is vertically above the person's lower limb and faces the person's lower limb when the person is seated in vehicle 1. In this case, even when the person's lower limb contacts lower-limb facing portion 25, the detection sensitivity of second sensor electrode 13*a* is low, and overhangs 121*a*, 121*b* of first sensor electrode 12*a* detect the contact of the lower limb. This can make it difficult for both first sensor electrode 12*a* and second sensor electrode 13*a* to simultaneously detect the contact of the lower limb. Therefore, the person's lower limb unexpectedly contacts steering wheel 2, erroneous detection due to the contact of the lower limb can be prevented.

Note that notches 131*a*, 131*b* and overhangs 121*a*, 121*b* may be combined with the above embodiment.

(Variation 2 of Embodiment)

First, electrode structure 10*b* of the present variation will be described with reference to FIGS. 7 and 8.

Figure 7:
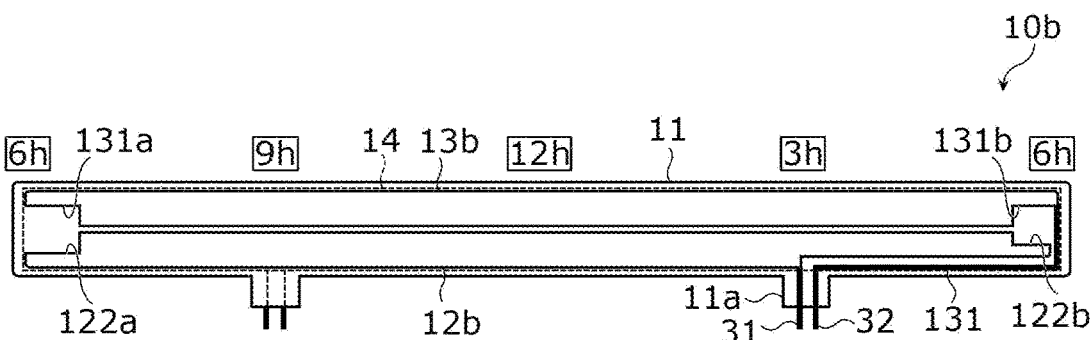
FIG. 7 is a plan view illustrating an electrode structure according to Variation 2 of the embodiment.
Figure 8:
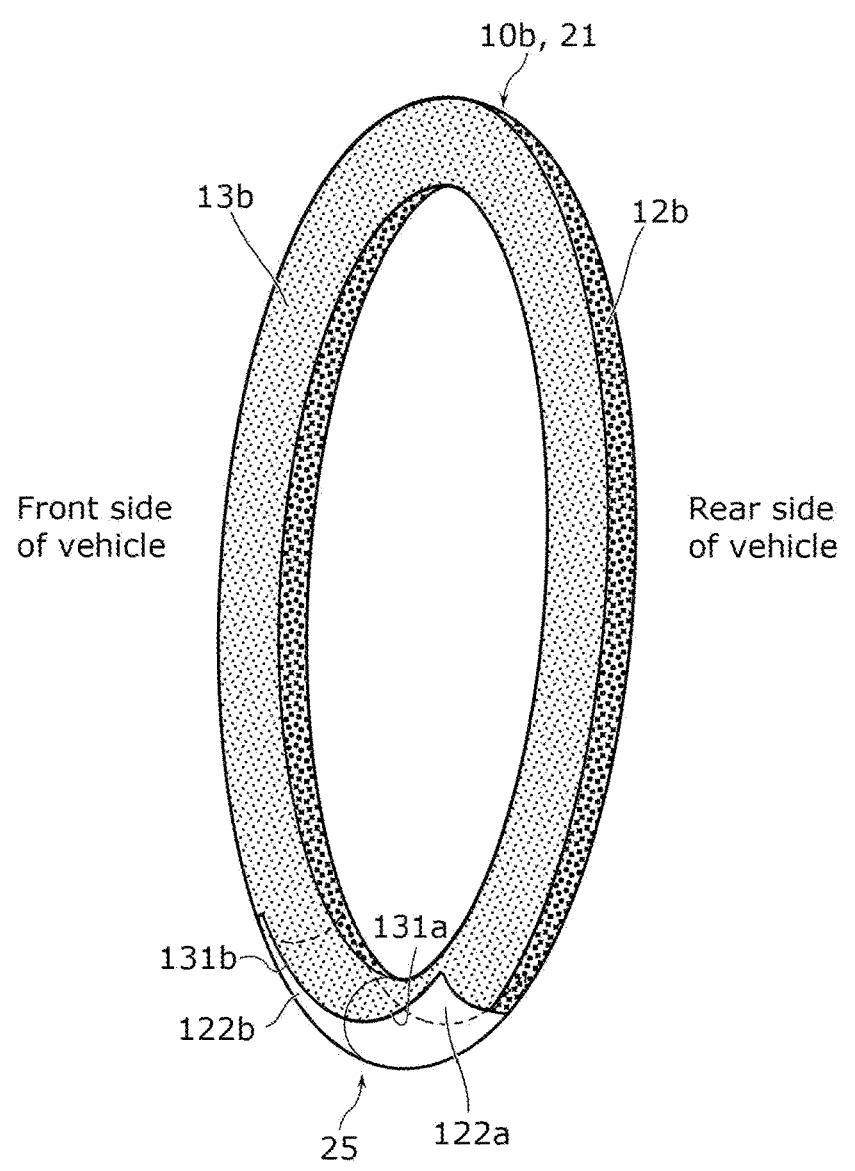
FIG. 8 is a perspective view illustrating a positional relationship between a first sensor electrode and a second sensor electrode in a state where the electrode structure is wound around the rim according to Variation 2 of the embodiment.

FIG. 7 is a plan view illustrating electrode structure 10*b* according to Variation 2 of the embodiment. FIG. 8 is a perspective view illustrating a positional relationship between first sensor electrode 12*b* and second sensor electrode 13*b* in a state where electrode structure 10*b* according to Variation 2 of the embodiment is wound around rim 21. In FIG. 8, extended wiring 131, a predetermined gap, and the like are omitted to avoid complicating the figure.

The present variation differs from the embodiment in that the configurations of first sensor electrode 12*a* and second sensor electrode 13*a* are different from those of the embodiment. Other configurations in the present variation are similar to those in the embodiment unless otherwise specified. The same reference numerals are assigned to the same configurations, and a detailed description of these configurations is omitted.

First sensor electrode 12*b* and second sensor electrode 13*b* each form an elongated strip shape along the longitudinal direction of base material 11.

Notches 122*a*, 122*b*, which are partially cut, are formed at both ends of first sensor electrode 12*b*. Specifically, notch 122*a* is formed at a position from 6*h* to 7*h* at one end of base material 11, and notch 122*b* is formed at a position from 5*h* to 6*h* at the other end of base material 11.

Notches 131*a*, 131*b*, which are partially cut, are formed at both ends of second sensor electrode 13*a*. Specifically, notch 131*a* is formed at a position from 6*h* to 7*h* at one end of base material 11, and notch 131*b* is formed at a position from 5*h* to 6*h* at the other end of base material 11.

First protrusion 11*a* is formed in base material 11 at the 3*h* position to correspond to the location on first sensor electrode 12*b* from which first harness 31 is extended. In second sensor electrode 13*b*, extended wiring 131 is formed, running from notch 131*b* at the 6*h* position on base material 11 to first protrusion 11*a* of base material 11, while passing by notch 122*b* of first sensor electrode 12*b* on base material 11. In first protrusion 11*a*, first sensor electrode 12*b* and one end of first harness 31 are electrically connected by a fastening member, and extended wiring 131 of second sensor electrode 13*b* and one end of second harness 32 are electrically connected by a fastening member. The other end of first harness 31 and the other end of second harness 32 are connected to ECU connector 3*b*.

When electrode structure 10*b* with such a configuration is wound around rim 21, both first sensor electrode 12*b* and second sensor electrode 13*b* are not disposed in lower-limb facing portion 25, which is the lower end portion of steering wheel 2. This enables lower-limb facing portion 25 to be a non-sensitive region.

In this case, even when the person's lower limb contacts lower-limb facing portion 25, the detection sensitivities of first sensor electrode 12*b* and second sensor electrode 13*b* are low, thus making it difficult for both first sensor electrode 12*b* and second sensor electrode 13*b* to detect the contact of the lower limb with steering wheel 2. Therefore, even when the person's lower limb unexpectedly contacts steering wheel 2, erroneous detection due to the contact of the lower limb can be prevented.

Note that notches 122*a*, 122*b*, 131*a*, 131*b* may be combined with the above embodiment.

(Variation 3 of Embodiment)

First, electrode structure 10*c* of the present variation will be described with reference to FIG. 9.

Figure 9:
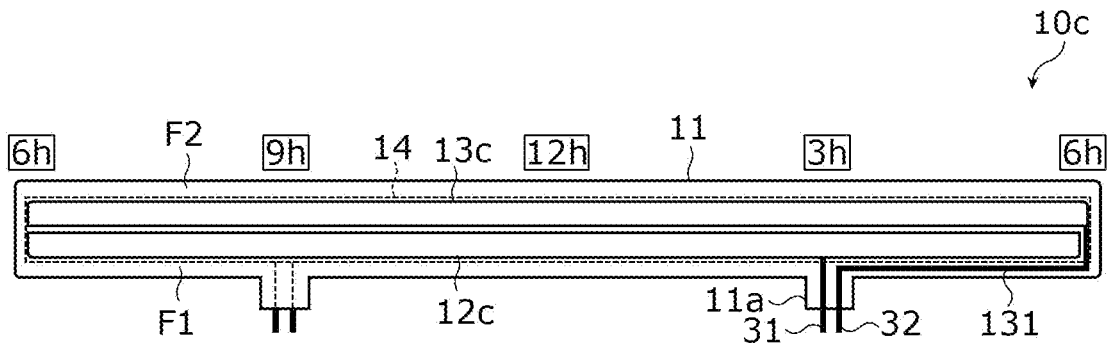
FIG. 9 is a plan view illustrating an electrode structure according to Variation 3 of the embodiment.

FIG. 9 is a plan view illustrating electrode structure 10*c* according to Variation 3 of the embodiment.

The present variation differs from the embodiment in that an insensitive body is formed along the longitudinal direction of base material 11. Other configurations in the present variation are similar to those in the embodiment unless otherwise specified. The same reference numerals are assigned to the same configurations, and a detailed description of these configurations is omitted.

First sensor electrode 12*c* and second sensor electrode 13*c* each form an elongated strip shape along the longitudinal direction of base material 11.

First insensitive body F1, in which first sensor electrode 12*c* is not disposed, is formed between first sensor electrode 12c and one side edge of base material 11. Second insensitive body F2, in which second sensor electrode 13c is not disposed, is formed between second sensor electrode 13c and the other side edge of base material 11.

First insensitive body F1 and second insensitive body F2 are elongated in the longitudinal direction of base material 11. The width of first insensitive body F1 is smaller than the width of first sensor electrode 12c, and the width of second insensitive body F2 is smaller than the width of second sensor electrode 13c. The width of each of first insensitive body F1 and second insensitive body F2 is larger than the width of extended wiring 131.

This may cause a sensitivity difference between first sensor electrode 12c and second sensor electrode 13c when first sensor electrode 12c is disposed in first insensitive body F1 except for the portion where extended wiring 131 is disposed. To equalize the sizes (surface areas) of first sensor electrode 12c and second sensor electrode 13c so as to minimize any potential sensitivity difference between first sensor electrode 12c and second sensor electrode 13c, the transverse width of first sensor electrode 12c is made substantially uniform, and the transverse width of second sensor electrode 13c is also made substantially uniform. Furthermore, the transverse width of first sensor electrode 12c may be made similar to the transverse width of second sensor electrode 13c. Thereby, first insensitive body F1 and second insensitive body F2 are formed on base material 11. When electrode structure 10c is wound around rim 21, first insensitive body F1 and second insensitive body F2 are positioned on the inner circumferential side of steering wheel 2.

When electrode structure 10c with such a configuration is wound around rim 21, the sensitivity difference depending on the location on steering wheel 2 can be reduced. Therefore, the detection accuracies of first sensor electrode 12c and second sensor electrode 13c are equalized, so that steering wheel 2 being gripped by the person's hand can be detected more effectively.

Figure 10:
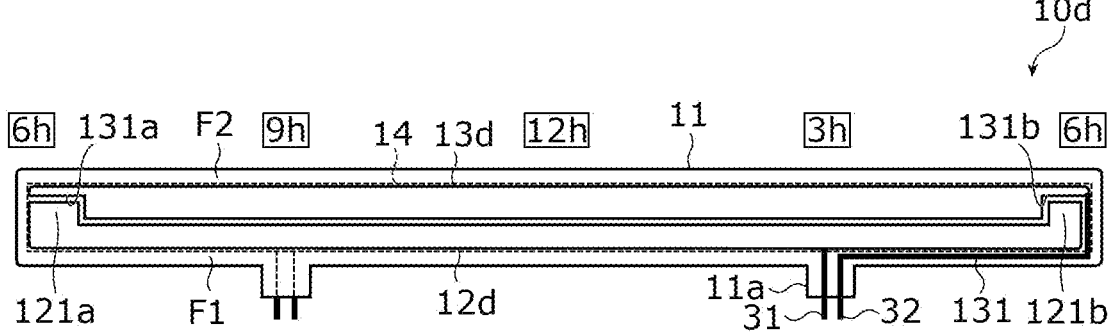
FIG. 10 is a plan view illustrating another electrode structure according to Variation 3 of the embodiment.
Figure 11:
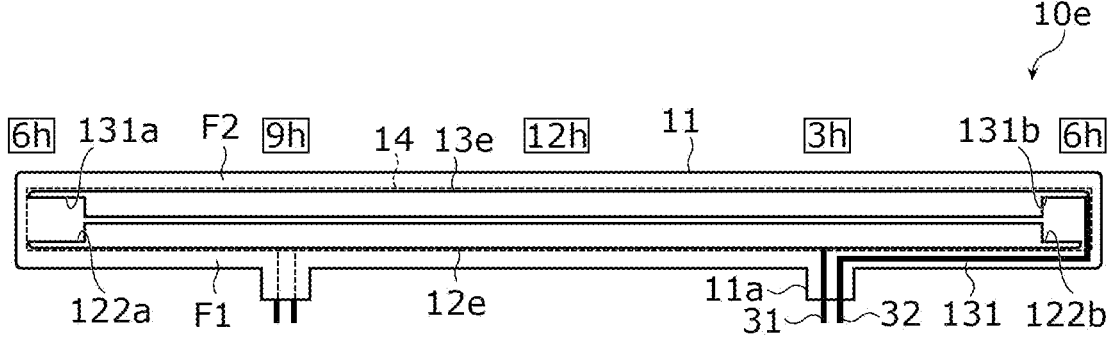
FIG. 11 is a plan view illustrating still another electrode structure according to Variation 3 of the embodiment.

As illustrated in FIG. 10, the present variation may be applied to Variation 1 of the embodiment, and as illustrated in FIG. 11, the present variation may be applied to Variation 2 of the embodiment. FIG. 10 is a plan view illustrating another electrode structure 10d according to Variation 3 of the embodiment. FIG. 11 is a plan view illustrating still another electrode structure 10e according to Variation 3 of the embodiment.

As illustrated in FIG. 10, the transverse width of first sensor electrode 12d and the transverse width of second sensor electrode 13d are of equal length. First insensitive body F1, in which first sensor electrode 12d is not disposed, is formed between first sensor electrode 12d and one side edge of base material 11. Second insensitive body F2, in which second sensor electrode 13d is not disposed, is formed between second sensor electrode 13d and one side edge of base material 11.

As illustrated in FIG. 11, the transverse width of first sensor electrode 12e and the transverse width of second sensor electrode 13e are of equal length. First insensitive body F1, in which first sensor electrode 12e is not disposed, is formed between first sensor electrode 12e and one side edge of base material 11. Second insensitive body F2, in which second sensor electrode 13e is not disposed, is formed between second sensor electrode 13e and one side edge of base material 11.

In the case of the configurations illustrated in FIGS. 10 and 11, it is possible to achieve a better balance between preventing erroneous detection caused by the contact of the lower limb and detecting the gripping of steering wheel 2 by the person's hand.

(Other Variations)

The electrode structure according to the present disclosure has been described above based on the above embodiment, but the present disclosure is not limited to this embodiment. Various variations of the embodiment conceived by one skilled in the art may be included in the scope of the present disclosure as long as the variations do not depart from the spirit of the present disclosure.

Figure 12:
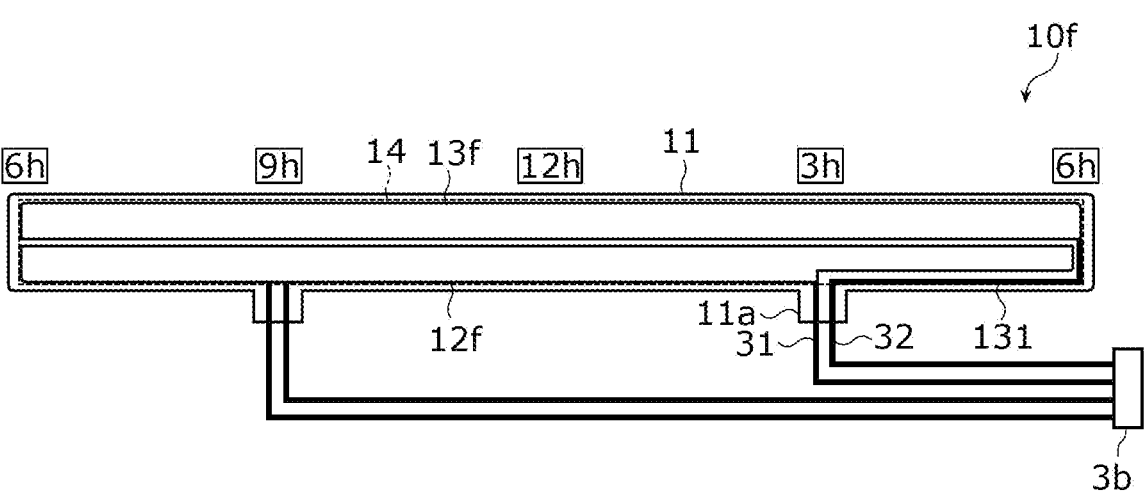
FIG. 12 is a plan view illustrating an electrode structure according to another Variation.

For example, electrode structure 10f according to the present disclosure may have a configuration illustrated in FIG. 12. FIG. 12 is a plan view illustrating electrode structure 10f according to another variation. As illustrated in FIG. 12, first protrusion 11a is formed in base material 11 at the 3h position to correspond to the location on second sensor electrode 13f from which second harness 32 is extended. In second sensor electrode 13f, extended wiring 131 is formed, running from the 6h position at the other end of base material 11 to first protrusion 11a of base material 11, while passing by first sensor electrode 12f at the other end of base material 11. In first protrusion 11a described above, first sensor electrode 12f and one end of first harness 31 are electrically connected by a fastening member, and extended wiring 131 of second sensor electrode 13f and one end of second harness 32 are electrically connected by a fastening member. With such a configuration, first harness 31 and second harness 32 can be extended from the same place (first protrusion 11a), and first harness 31 and second harness 32 can be bundled together. This prevents the formation of a loop among base material 11 on which first sensor electrode 12f and second sensor electrode 13f are arranged, first harness 31 and second harness 32 that are bundled together, and the ECU connector. In this case, there is no need to provide a relay connector in first harness 31 and second harness 32. By disposing extended wiring 131 at the 6h position, when electrode structure 10f is wound around the rim, extended wiring 131 is positioned at the lower-limb facing portion of the steering wheel, so that extended wiring 131 can be disposed in a position with low gripping frequency by the person's hand. Since extended wiring 131 has a small area and low detection sensitivity, even when extended wiring 131 is disposed in a position with low gripping frequency by the person's hand, this placement is unlikely to influence the deterioration of the detection accuracy in first sensor electrode 12f. Thus, by disposing extended wiring 131 in the lower-limb facing portion, the deterioration of the detection accuracy in first sensor electrode 12f can be reduced.

The configuration illustrated in FIG. 12 may be combined with the above embodiment and Variations 1 to 3 of the above embodiment.

Note that the present disclosure includes forms obtained by applying various variations that can be conceived by one skilled in the art to the above embodiment, and forms realized by any combination of the components and functions of the embodiment without departing from the spirit of the present disclosure.

(Note)

The features of the electrode structure described based on the above embodiment will be described below.

<Technique 1>

An electrode structure to be wound around a rim of a steering wheel provided in a vehicle, the electrode structure including:

a base material;

a first sensor electrode disposed on one surface of the base material;

a second sensor electrode disposed on the one surface of the base material to be aligned with the first sensor electrode;

a first harness extended from the first sensor electrode;

a second harness extended from the second sensor electrode;

a connector to which the first harness and the second harness are connected; and a relay connector including a male connector and a female connector that is connected to the male connector, wherein at least one of the first harness or the second harness is provided with the relay connector.

<Technique 2>

The electrode structure according to Technique 1, wherein in a state where the base material is disposed on the rim, the first sensor electrode is disposed on a side of the rim facing a rear side of the vehicle, and the second sensor electrode is disposed on a side of the rim facing a front side of the vehicle.

<Technique 3>

The electrode structure according to Technique 1 or 2, wherein the relay connector includes a first relay connector provided at the first harness and a second relay connector provided at the second harness, the first relay connector includes a first male connector and a first female connector that is connected to the first male connector, and the second relay connector includes a second male connector and a second female connector that is connected to the second male connector.

<Technique 4>

The electrode structure according to Technique 3, further including:

a ground electrode disposed on the other surface of the base material; and a third harness extended from the ground electrode, wherein the third harness is further connected to the connector.

<Technique 5>

The electrode structure according to any one of Techniques 1 to 4, wherein a length of at least one of the first harness or the second harness is a length that enables the relay connector to be disposed in a central region of the steering wheel and near a shaft of the steering wheel.

<Technique 6>

The electrode structure according to Technique 3 or 4, wherein the first harness includes a first electrode-side harness on a side of the first sensor electrode, and a first connector-side harness on a side of the connector, the second harness includes a second electrode-side harness on a side of the second sensor electrode, and a second connector-side harness on the side of the connector, and the first male connector is disposed at the first electrode-side harness on the side of the first sensor electrode, the first female connector is disposed at the first connector-side harness on the side of the connector, the second female connector is disposed at the second electrode-side harness on the side of the second sensor electrode, and the second male connector is disposed at the second connector-side harness on the side of the connector, or the first female connector is disposed at the first electrode-side harness on the side of the first sensor electrode, the first male connector is disposed at the first connector-side harness on the side of the connector, the second male connector is disposed at the second electrode-side harness on the side of the second sensor electrode, and the second female connector is disposed at the second connector-side harness on the side of the connector.

<Technique 7>

The electrode structure according to Technique 6, wherein the first male connector and the second female connector are connectable to each other, and the second male connector and the first female connector are connectable to each other.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosure of the following patent application including specification, drawings, and claims are incorporated herein by reference in their entirety: Japanese Patent Application No. 2023-066577 filed on Apr. 14, 2023.

INDUSTRIAL APPLICABILITY

The electrode structure according to the present disclosure can be applied to a steering wheel of a mobile body or the like.

The invention claimed is:

1. An electrode structure to be wound around a rim of a steering wheel provided in a vehicle, the electrode structure comprising:

a base material;

a first sensor electrode disposed on one surface of the base material;

a second sensor electrode disposed on the one surface of the base material to be aligned with the first sensor electrode;

a first harness extended from the first sensor electrode;

a second harness extended from the second sensor electrode;

a connector to which the first harness and the second harness are connected; and a relay connector including a male connector and a female connector that is connected to the male connector, wherein at least one of the first harness or the second harness is provided with the relay connector.

2. The electrode structure according to claim 1, wherein in a state where the base material is disposed on the rim, the first sensor electrode is disposed on a side of the rim facing a rear side of the vehicle, and the second sensor electrode is disposed on a side of the rim facing a front side of the vehicle.

3. The electrode structure according to claim 1, wherein the relay connector includes a first relay connector provided at the first harness and a second relay connector provided at the second harness, the first relay connector includes a first male connector and a first female connector that is connected to the first male connector, and the second relay connector includes a second male connector and a second female connector that is connected to the second male connector.

4. The electrode structure according to claim 3, further comprising:

a ground electrode disposed on an other surface of the base material; and a third harness extended from the ground electrode, wherein the third harness is further connected to the connector.

5. The electrode structure according to claim 3, wherein the first harness includes a first electrode-side harness on a side of the first sensor electrode, and a first connector-side harness on a side of the connector, the second harness includes a second electrode-side harness on a side of the second sensor electrode, and a second connector-side harness on the side of the connector, and the first male connector is disposed at the first electrode-side harness on the side of the first sensor electrode, the first female connector is disposed at the first connector-side harness on the side of the connector, the second female connector is disposed at the second electrode-side harness on the side of the second sensor electrode, and the second male connector is disposed at the second connector-side harness on the side of the connector, or the first female connector is disposed at the first electrode-side harness on the side of the first sensor electrode, the first male connector is disposed at the first connector-side harness on the side of the connector, the second male connector is disposed at the second electrode-side harness on the side of the second sensor electrode, and the second female connector is disposed at the second connector-side harness on the side of the connector.

6. The electrode structure according to claim 5, wherein the first male connector and the second female connector are connectable to each other, and the second male connector and the first female connector are connectable to each other.

7. The electrode structure according to claim 1, wherein a length of at least one of the first harness or the second harness is a length that enables the relay connector to be disposed in a central region of the steering wheel and near a shaft of the steering wheel.

* * * * *